(12) United States Patent
Le (10) Patent No.: US 7,621,804 B1
(45) Date of Patent: Nov. 24, 2009

(54) OYSTER OPENER AND METHOD

(76) Inventor: Chi Minh Le, 363 Louisiana St., Westwego, LA (US) 70094

( * ) Notice: Subject to any disclaimer, the term of this patent is extended or adjusted under 35 U.S.C. 154(b) by 0 days.

(21) Appl. No.: 12/194,820

(22) Filed: Aug. 20, 2008

(51) Int. Cl.
*A22C 25/02* (2006.01)
(52) U.S. Cl. ......................................... 452/13
(58) Field of Classification Search ................ 452/12, 452/173, 198, 106, 99
See application file for complete search history.

(56) References Cited

U.S. PATENT DOCUMENTS

| | | | | |
|---|---|---|---|---|
| 1,383,162 A | * | 6/1921 | Sprague | 452/99 |
| 1,779,046 A | * | 10/1930 | Mcnaney | 452/12 |
| 2,608,716 A | * | 9/1952 | Harris | 452/14 |
| 2,652,588 A | * | 9/1953 | Harris | 452/15 |
| 2,832,989 A | * | 5/1958 | Harris | 452/14 |
| 3,238,560 A | * | 3/1966 | Jurisich | 452/13 |
| 4,236,276 A | * | 12/1980 | Van Twuyver et al. | 452/14 |
| 4,312,099 A | * | 1/1982 | Cohen | 452/12 |
| 4,348,788 A | | 9/1982 | Jurcak | |
| 4,617,734 A | | 10/1986 | Parkinson | |
| D309,408 S | | 7/1990 | Bell | |
| D358,307 S | | 5/1995 | Plamann et al. | |
| 5,482,500 A | | 1/1996 | Boettner et al. | |
| D404,978 S | | 2/1999 | Youngblood, Jr. | |
| 6,508,699 B1 | * | 1/2003 | Santoriello et al. | 452/99 |
| 6,785,967 B1 | | 9/2004 | Allievi | |
| D507,161 S | | 7/2005 | Ott et al. | |

\* cited by examiner

*Primary Examiner*—Thomas Price
(74) *Attorney, Agent, or Firm*—Garvey, Smith, Nehrbass & North, L.L.C.; Brett A. North (57) ABSTRACT

An oyster opening apparatus provides a rotary drum having an interior for holding unopened oysters. Projections or baffles on the drum interior lift and then drop the oysters, thereby loosening their shell parts. Removal of the edible part can then be completed manually using an oyster knife.

12 Claims, 9 Drawing Sheets

OYSTER OPENER AND METHOD

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus for opening oysters that employs a rotating housing or drum having an interior for containing a plurality of oysters and one or more projections or baffles placed within the interior. More particularly, the present invention relates to an improved method and apparatus for opening oysters that employs a rotating housing or drum having one or more projections or baffles configured to catch and hold oysters momentarily during rotation, each baffle dumping the oysters downwardly into the drum as the baffle reaches an upper portion of the drum, wherein the rotating action of the drum and baffles gradually loosens shells of each oyster, providing a gap that enables easy manual opening of the oysters after they are removed from the drum.

2. General Background of the Invention

An oyster is a bi-valve mollusk of the family Ostreidae. An oyster has an irregular shell that is closed by a single adductor muscle. The two part shell of an oyster is very tightly closed when the oyster is first harvested. In the past, oysters have been typically opened manually using a knife that is provided with a relatively blunt blade and a handle for gripping by the hand of a user.

Some machines have been patented, which disclose machines purported to open oysters. The following possibly relevant U.S. Patents are incorporated herein by reference:

TABLE

| U.S. Pat. No. | TITLE | ISSUE DATE |
| --- | --- | --- |
| 4,348,788 | Oyster Opener | Sep. 14, 1982 |
| 4,617,734 | Oyster Opener | Oct. 21, 1986 |
| D309,408 | Oyster Opener | Jul. 24, 1990 |
| D358,307 | Easy Oyster Opener | May 16, 1995 |
| 5,482,500 | Claim and Oyster Opener | Jan. 09, 1996 |
| D404,978 | Oyster Opener | Feb. 02, 1999 |
| 6,785,967 | Clam and Oyster Opener | Sep. 07, 2004 |
| D507,161 | Oyster Opener | Jul. 12, 2005 |

BRIEF SUMMARY OF THE INVENTION

The present invention provides an improved method and apparatus for opening oysters. In one embodiment the method includes the following steps: (a) providing a rotating device; (b) providing a plurality of oysters to be opened; (c) placing the plurality of oysters in the rotating device; (d) rotating the plurality of oysters with the rotating device causing a plurality of the oyster shells to at least partially separated; (e) removing the plurality of oysters from the rotating device; and (f) opening the plurality of oysters which have been at least partially separated.

In one embodiment the rotating device is a drum or housing.

In one embodiment a sackfull of oysters are removed from the sack and placed in the drum during step "c" before being rotated in step "d."

In one embodiment water is sprayed in the drum during step "d." In one embodiment water is sprayed in the drum after step "d."

In one embodiment the horizontal level of the drum or housing can be tilted relative to a horizontal plane either rotated upwards or rotated downwards. In one embodiment the rotation of the drum or housing can be performed while the drum is tilted (either upwardly or downwardly) from a horizontal plane. In one embodiment during step "d" the drum or housing can be tilted (either upwardly or downwardly) from a horizontal plane to control the falling and impact of the oysters inside the drum or housing.

In one embodiment during use, the drum is filled with a plurality of oysters to be opened. A plurality of plates, baffles or projections are provided within the housing or drum interior. These projections rotate with the drum or housing outer wall.

In one embodiment the drum or housing includes at least one lifting plate, baffle, or projection. In one embodiment the drum or housing includes a plurality of lifting plates, baffles, or projections.

In one embodiment the plurality of lifting plates, baffles, or projections are symmetrically distributed around a cross section of the drum or housing.

In one embodiment the plurality of lifting plates, baffles, or projections are symmetrically distributed around a cross section of the drum or housing but are offset from the line of rotation of the drum or housing. In one embodiment the offset relative to the longitudinal line of rotation is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, and 45 degrees. In various embodiments the offset is between about any two of the above referenced offsets. In various embodiments the offsets of the plurality of lifting plates, baffles, or projections are about equal and in the direction of rotation of the drum.

In one embodiment the plurality of plates, baffles, or projections include a rounded tip which resists chipping or cutting of the edges of the plurality of oysters in the drum or housing.

As the drum rotates, one or more oysters rests upon the plate, baffle, or projection and rotates upwardly with it. When the oysters reach an upper portion of the housing or drum, they are dumped from the baffle, plate, or projection and fall downwardly within the housing or drum. As the unopened oysters reach the bottom of the housing or drum, each oyster strikes the drum wall or another baffle. Continuous rotation of the drum results in repeated hits of the unopened oyster against the drum or housing or a projection or a baffle. Such action gradually weakens the connection that holds the two parts of the shell together. This weakening of the joint between the two parts of the shell produces a gap which can then be easily exploited with a knife (e.g. manually) to complete an opening of the oyster.

In one embodiment during separation the drum or housing can rotate about 5, 10, 15, 20, 25, 30, 35, 40, 45, 50, 55, 60, 62, 65, 70, 75, 80, 85, 90, 95, and/or 100 revolutions per minute.

In various embodiments the drum or housing can rotate between about any two of the above referenced rotational speeds.

In one embodiment during separation the drum or housing can rotate for about 5, 10, 15, 20, 25, 30, 35, 40, 45, 50, 55, 60, 62, 65, 70, 75, 80, 85, 90, 95, 100, 105, 110, 115, and/or 120 seconds. In various embodiments the drum or housing can rotate between about any two of the above referenced times.

In one embodiment drum or housing can have an average diameter of bout 5, 10, 15, 20, 24, 25, 30, 35, 36, 40, 45, 50, 55, 60, 62, 65, 70, 75, 80, 85, 90, 95, 100, 105, 110, 115, and/or 120 inches. In various embodiments the drum or housing can have an average diameter between about any two of the above referenced diameter.

In one embodiment, the drum or housing can be mounted on a moving frame which enables the drum or housing to be tilted for either accepting a plurality of oysters or for discharging a plurality of oysters into a selected container such as a sack, bag, drum, box or the like.

In one embodiment the drum or housing can be generally cylindrically shaped.

In one embodiment the drum or housing can have end portions.

In one embodiment the drum or housing can have end portions with an entry on one of its end portions.

In one embodiment the drum or housing can have one or more drains.

In one embodiment the drum or housing can have an outer wall which is perforated.

In one embodiment the drum or housing can have a motor drive operatively connected to and rotating the drum or housing.

In one embodiment the drum can have an internal spraying device.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

FIGS. 1-8 show the preferred embodiment of the apparatus of the present invention, designated generally by the numeral 10. Oyster opening apparatus 10 provides a housing or drum 11 that can be cylindrically shaped. The drum is supported with a support frame 12. The support frame 12 moves between operating and loading positions. The drum support frame 12 is also movable between operating and unloading positions.

Figure 1:
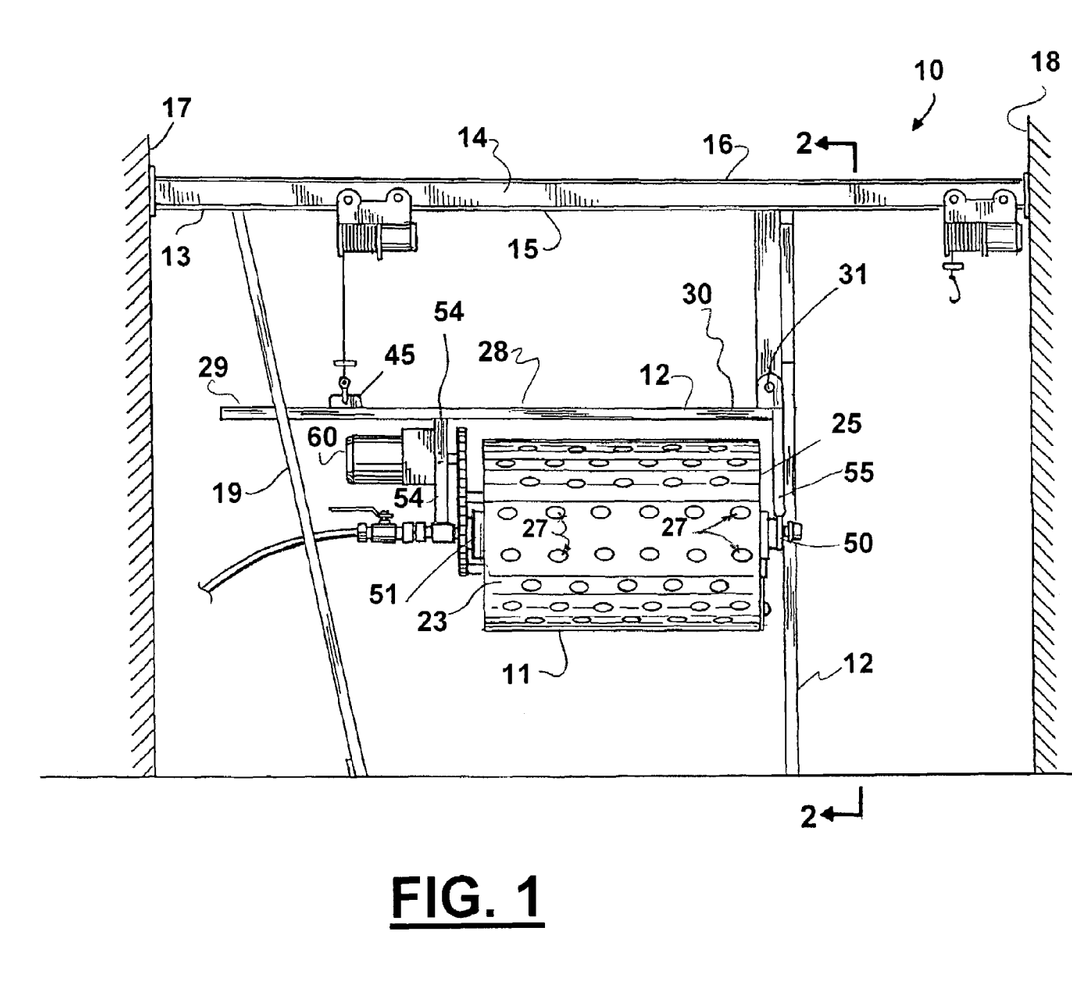
FIG. 1 is an elevation view of the preferred embodiment of the apparatus of the present invention.
Figure 3:
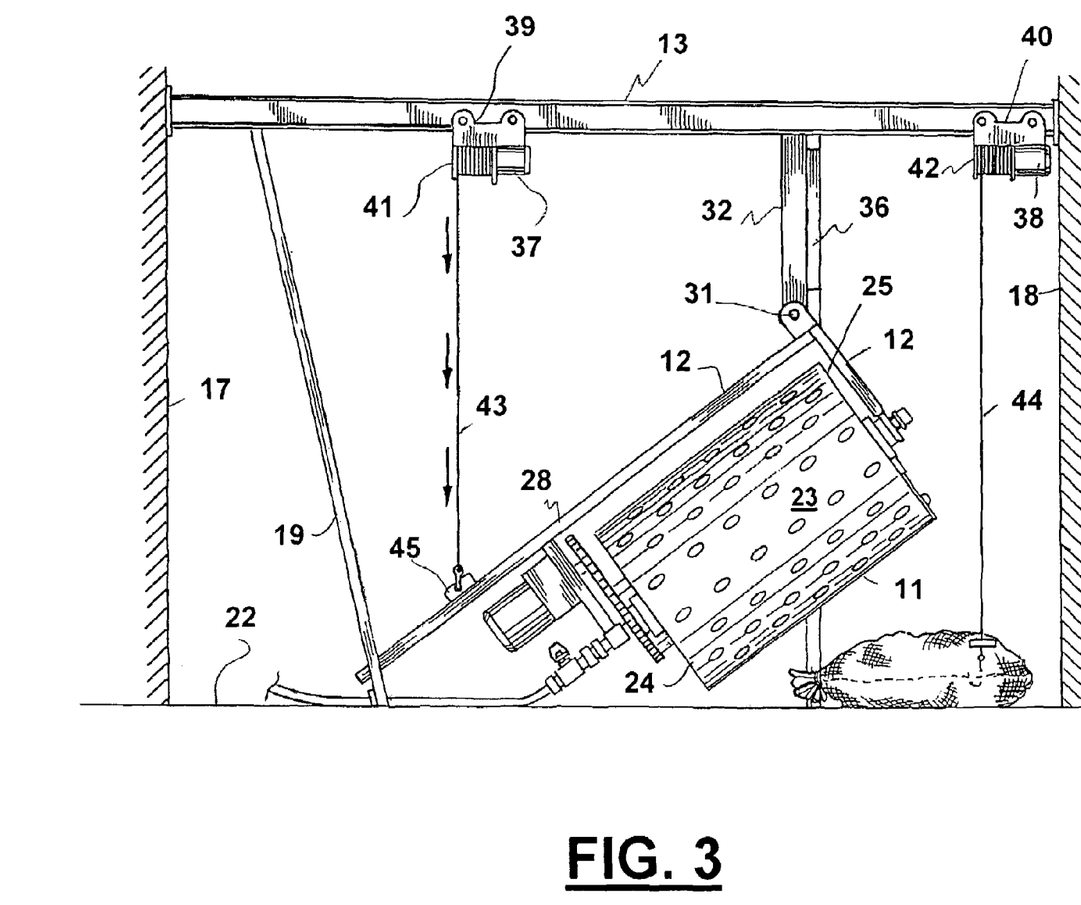
FIG. 3 is a side view of the preferred embodiment of the apparatus of the present invention showing the drum in a loading position.
Figure 5:
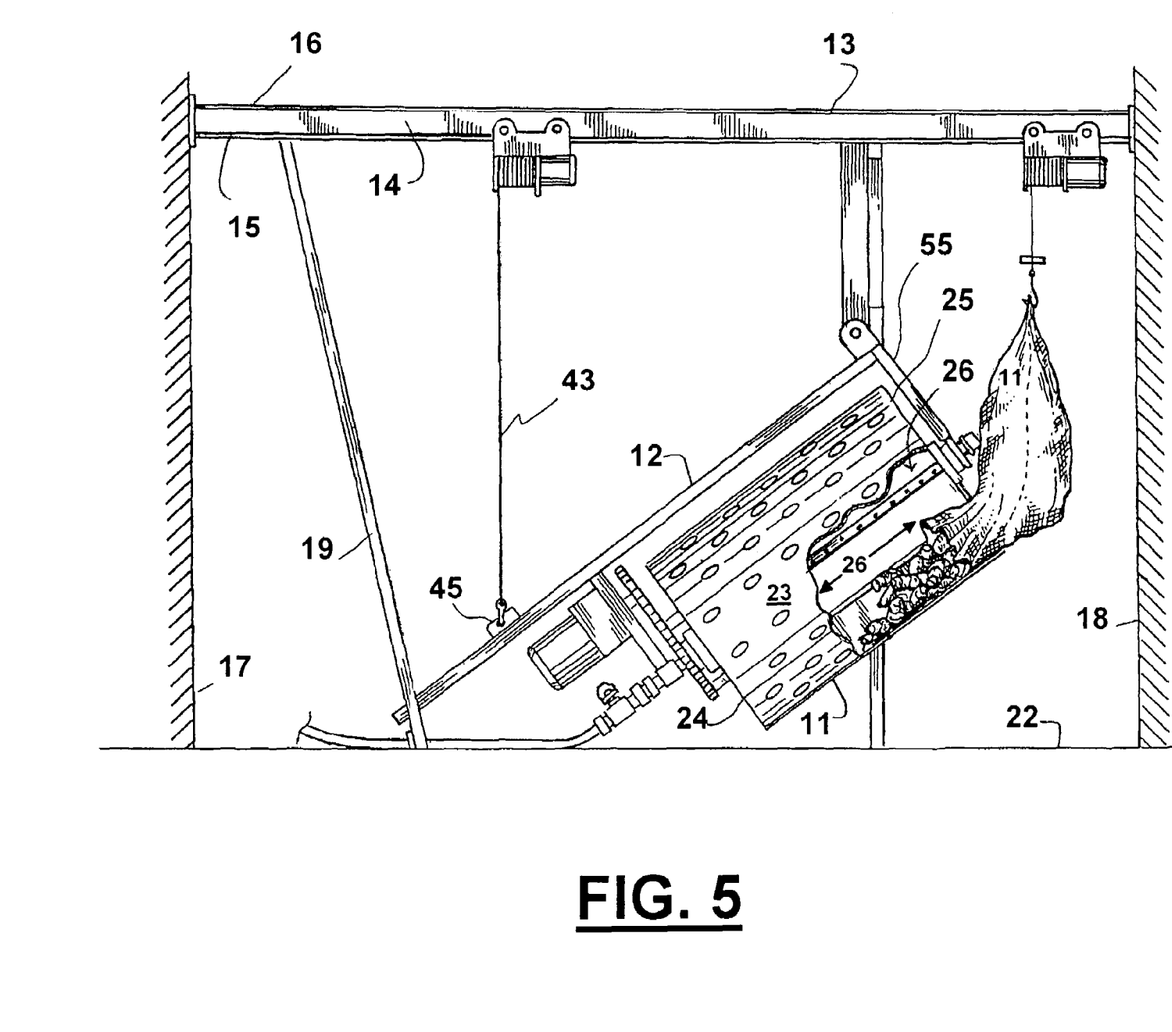
FIG. 5 is a side view of the preferred embodiment of the apparatus of e present invention illustrating an addition of oysters to the drum interior when the drum is in a loading position.
Figure 6:
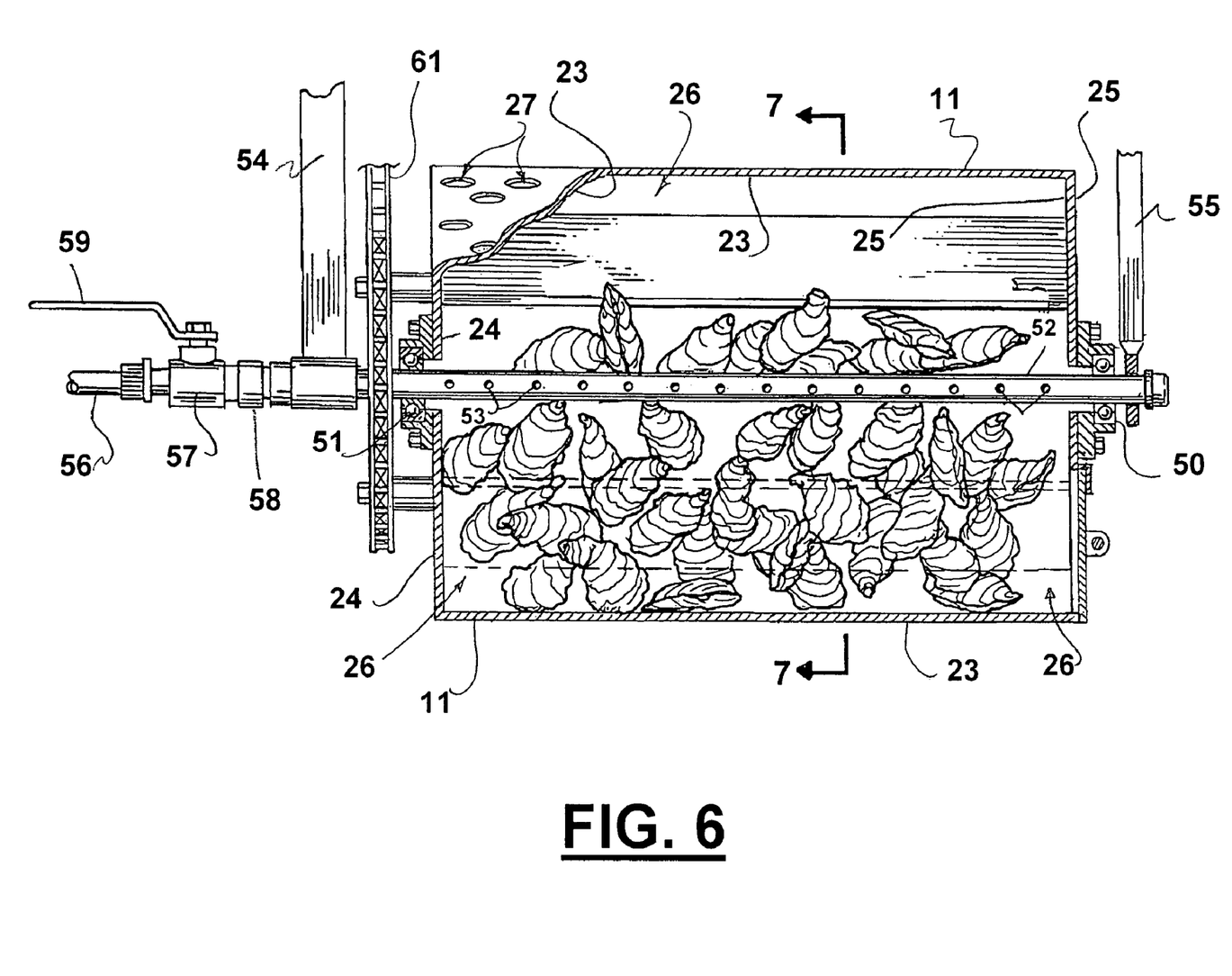
FIG. 6 is a partial side elevation view of the preferred embodiment of the apparatus of the present invention.

In FIGS. 1, 3 and 5, the apparatus 10 of the present invention can be shown, with frame 12 movably supported in a room or other building or structure having a plurality of walls and a floor 22. The walls can include walls 17, 18 and 21. The drum or housing 11 can be in the form of a cylinder or cylindrical shape. The drum or housing 11 provides a cylindrically shaped side wall 23 and circular end walls 24, 25. An interior 26 can also be generally cylindrically shaped. Drum cylindrical side wall 23 can be perforated, providing a plurality of perforations 27. These perforations 27 enable water to escape during a spray rinsing of the oysters 70.

Figure 2:
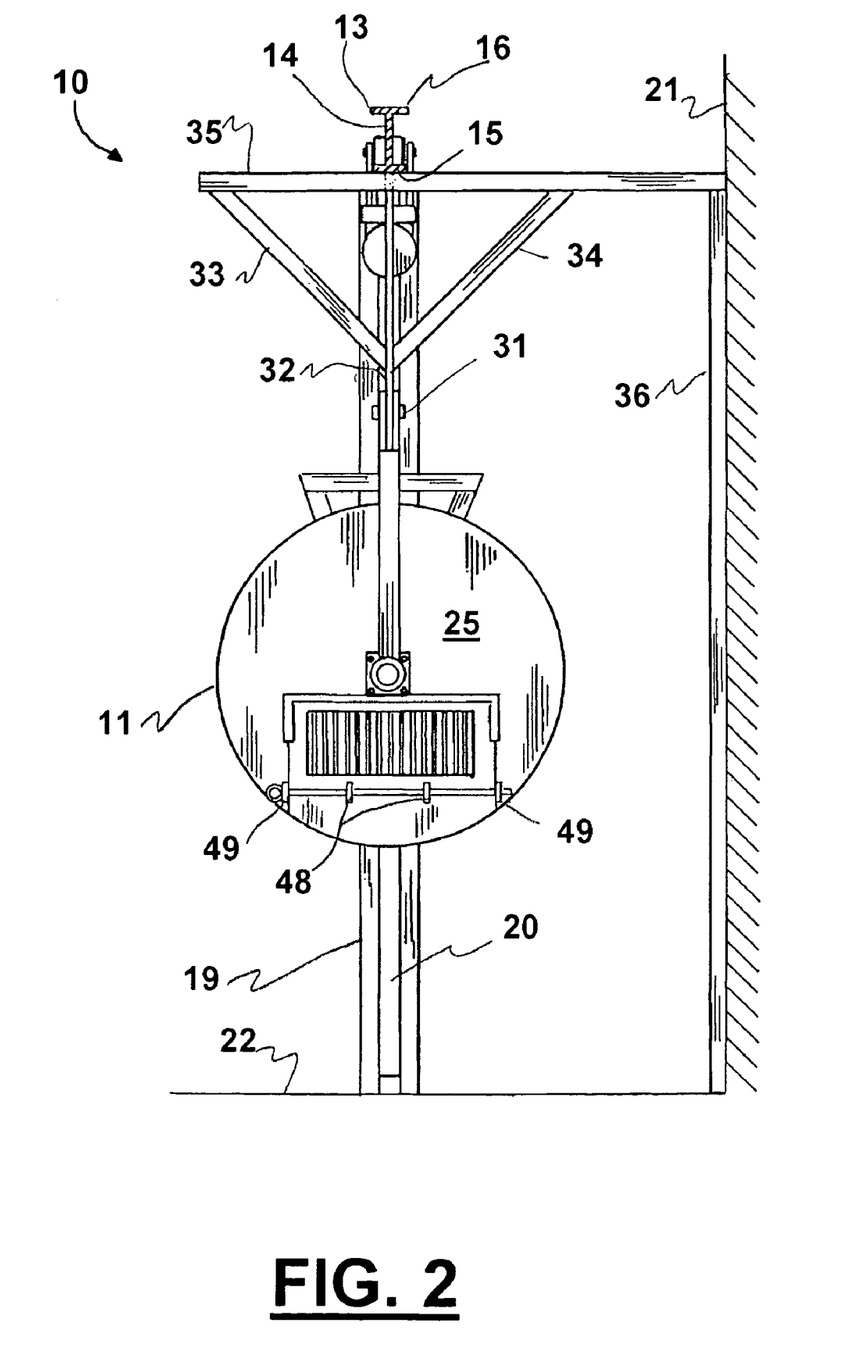
FIG. 2 is a view taken along lines 2-2 of FIG. 1.
Figure 4:
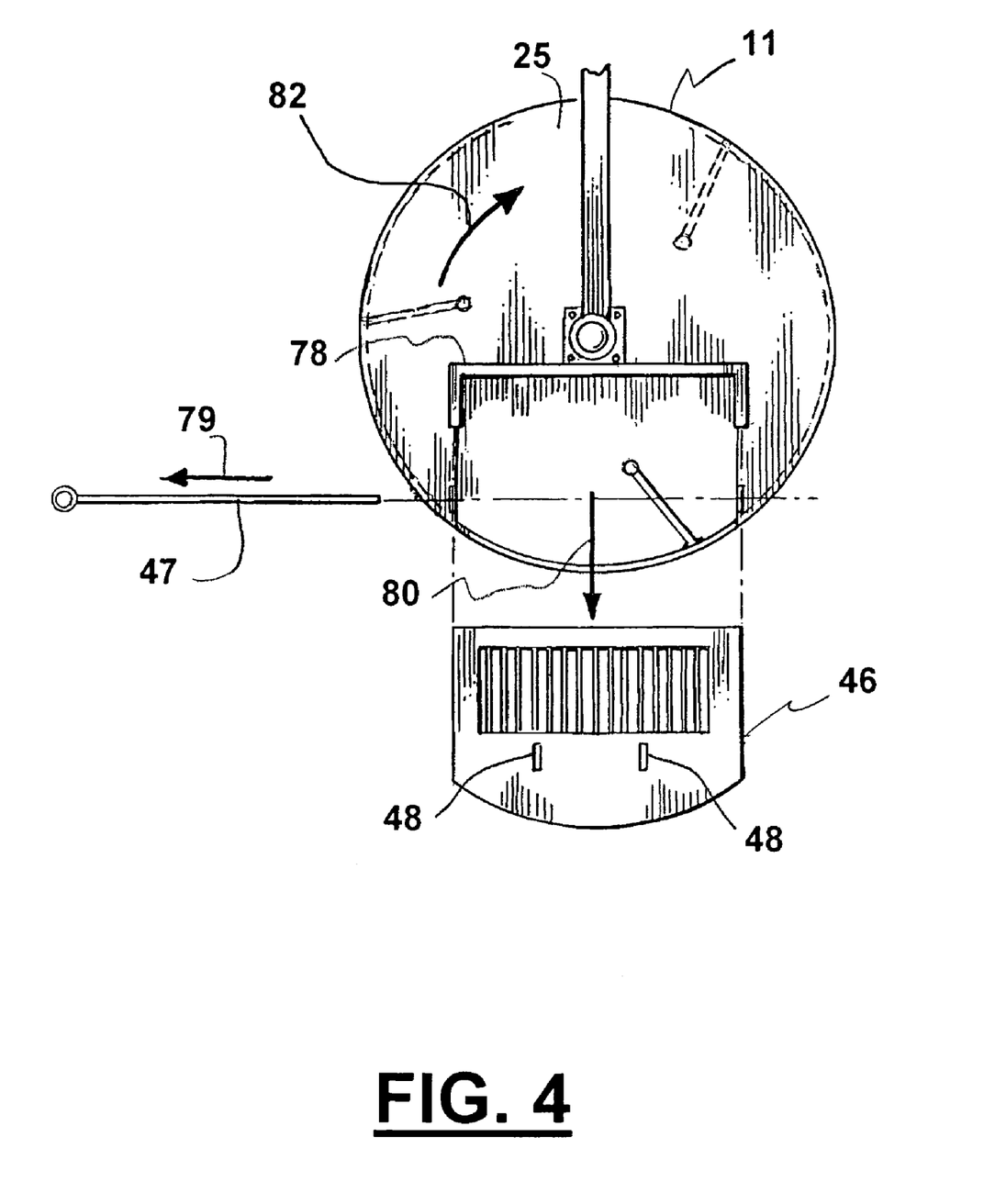
FIG. 4 is an end view of the preferred embodiment of the apparatus of the present invention showing the drum door in an open position such as during loading.

A door 46 is shown in FIGS. 2 and 4 that can be opened and closed. The door 46 can be secured to drum 11 end wall 25 using a pin 47. The pin 47 can extend through eyes 48 mounted on door 46 and eyes 49. Eyes 49 can be provided on end wall 25 as shown in FIG. 2. In the closed position, the pin 47 extends through eyes 48 and 49 as shown in FIG. 2. Arrow 79 in FIG. 4 illustrates a removal of pin 47 when door 46 is to be opened. Arrow 80 in FIG. 4 illustrates an opening of door 46, and its removal from drum 11. When connected to drum 11, door 46 can be secured within channel 78 which extends along three sides of door 46 as shown in FIGS. 2 and 4. Channel 78 can be u-shaped in transverse cross section.

Horizontal beam 13 can span between walls 17, 18 as shown in FIGS. 1, 3, and 5. Horizontal beam 13 can be an I-beam having a web 14 and flanges 15, 16 as shown. Inclined support 19 extends between horizontal beam 13 and floor 22. Inclined support 19 provides a slot 20 that is receptive of one end portion 29 of beam 28 of drum support frame 12. An opposing end portion 30 of beam 28 can be attached at pinned connection 31 to vertical beam 32. An upper end portion of beam 32 can be connected to flange 15 of beam 13, welded thereto for example. The beam 32 can be a vertical beam that is supported with diagonal members 33, 34, laterally extending horizontal member 35 and vertical member 36. Member 36 can be attached to wall 21 as shown in FIG. 2.

Figure 9:
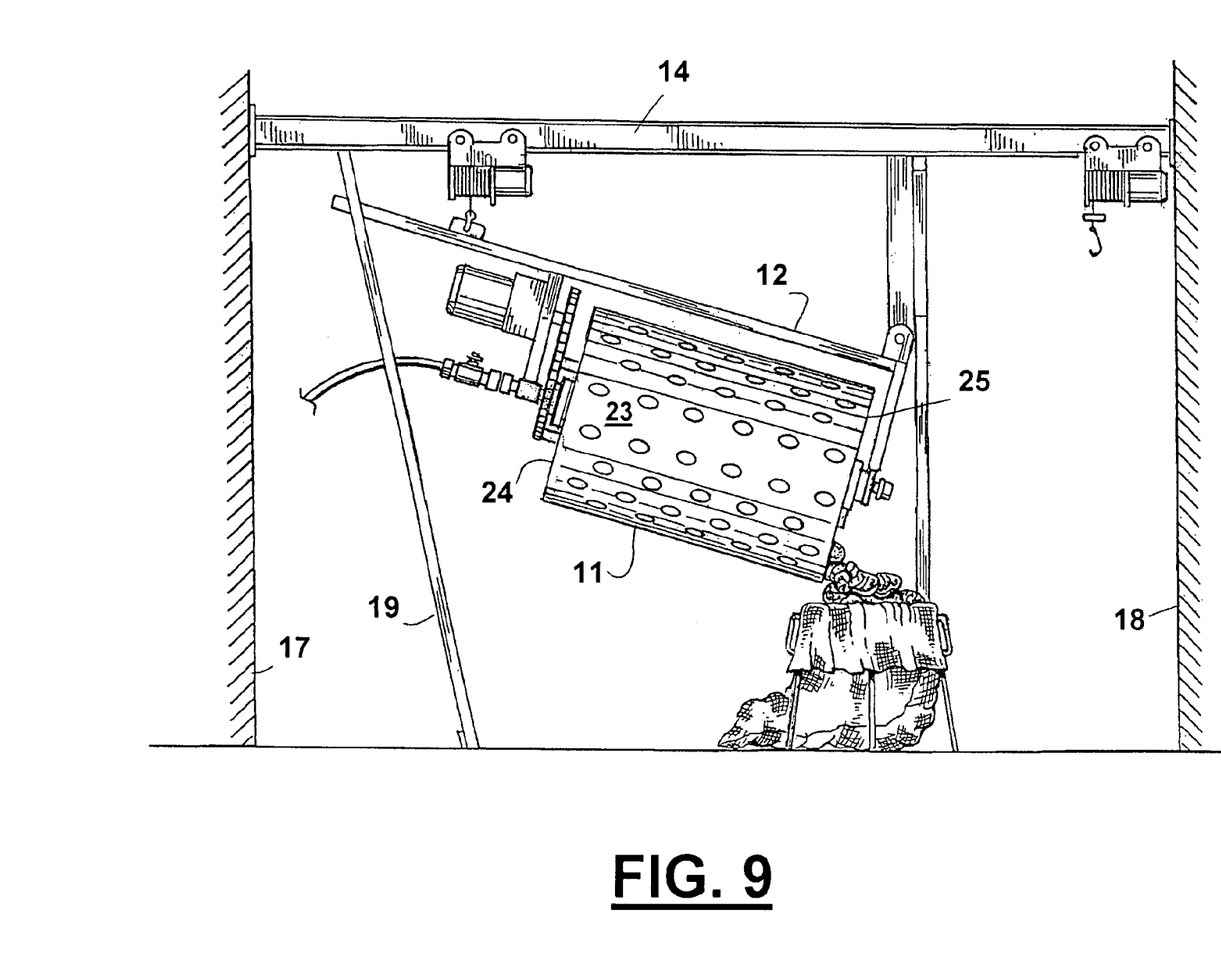
FIG. 9 is a side view of the preferred embodiment of the apparatus of the present invention illustrating a discharge of oysters into a selected container after the oysters have been rotated within the drum for a selected time.

A pair of overhead lifting devices 37, 38 can be provided to travel upon beam 13. Each lifting device 37, 38 can include a trolley 39, 40 and a winch or drum 41 or 42. Each winch or drum 41, 42 is wound with a winch line or lift cable 43, 44. The lift cable 43 attaches to beam 28 at lifting eye 45. In this fashion, the beam 28 and thus the drum 11 can be lowered during filling as shown in FIG. 5 and elevated during a rotational position of FIG. 1, and further elevated to discharge its contents as shown in FIG. 9.

Rotary bearings 50, 51 support drum or housing 11 for rotation. The bearings 50, 51 can best be seen in FIG. 6. A static perforated header 52 provides perforations or openings 53 for spraying water into drum interior 26. The header 52 is suspended from and supported by first and second supports 54, 55. The support 54 is a vertical member that is supported by beam 28 as shown in FIG. 1. A water supply hose 56 is fitted with valve 57 and coupler 58 for providing a water source to header 52. Handle 59 enables valve 57 to be opened or closed.

Motor drive 60 is connected to and supported by support 54. Motor drive 60 provides a drive gear that drives chain 61 which is connected to a drive gear that rotates drum 11. Other drives could be used to rotate drum 11. The support 55 can be attached to end 30 of beam 28 using welding for example.

Figure 7:
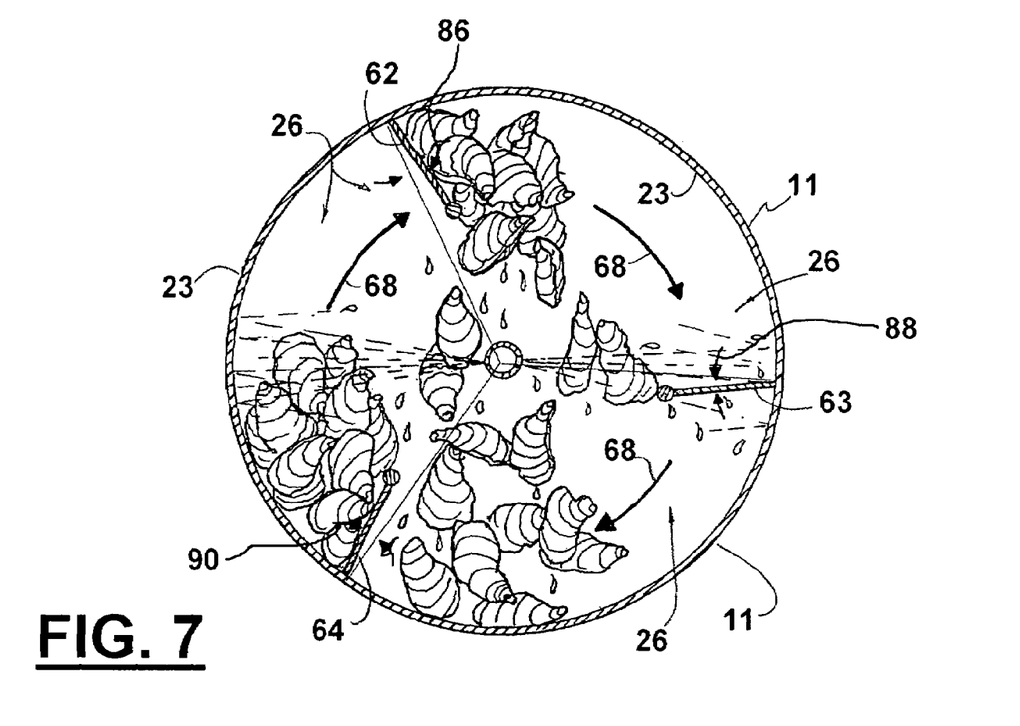
FIG. 7 is a sectional view taken along lines 7-7 of FIG. 8.

Drum cylindrical side wall 23 supports one or more baffles, plates or projections 62, 63, 64 as shown in FIG. 7. Such baffles, plates or projections could be apart of the housing or drum 11 or welded or connected thereto. Each baffle, plate, projection 62, 63, 64 can have a rounded end portion 65, 66, 67.

During use, the drum or housing 11 rotates in the direction of arrows 68 as shown in FIG. 7. Oysters 70 to be opened initially rest upon a projection 62-64 or in between a projection 62-64 and drum wall 23 as shown in FIG. 7. However, when the baffle, plate, or projection 62, 63, 64 reaches an upper position such as the plate 62 in FIG. 7, the oysters are dumped from the plate, baffle, or projection 62, 63, 64. Oysters 70 then fall downwardly striking the drum wall 23, or striking another plate or projection or baffle 62, 63, 64.

As shown by FIG. 7 plate, baffle, or projection 62, 63, 64 can be offset by angle 86, 88, or 90 which may or may not be equal.

Figure 8:
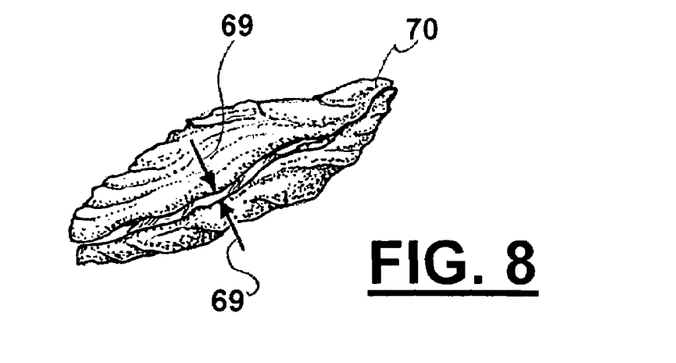
FIG. 8 is a schematic view of an oyster showing a gap that is produced after the oyster has been rotated in the drum part of the apparatus of the present invention for a selected period of time.

Continued rotation of the drum 11 gradually weakens the connective tissue of the oyster 70 that holds the two halves or parts 74, 75 of the shell together. As shown in FIG. 8, a gap 69 gradually opens for each oyster.

In one embodiment during separation the drum or housing 11 can rotate (schematically shown by arrow 82 in FIG. 4 and arrows 68 in FIG. 7) about 5, 10, 15, 20, 25, 30, 35, 40, 45, 50, 55, 60, 62, 65, 70, 75, 80, 85, 90, 95, and/or 100 revolutions per minute. In various embodiments the drum or housing 11 can rotate between about any two of the above referenced rotational speeds.

In one embodiment during separation the drum or housing 11 can rotate for about 5, 10, 15, 20, 25, 30, 35, 40, 45, 50, 55, 60, 62, 65, 70, 75, 80, 85, 90, 95, 100, 105, 110, 115, and/or 120 seconds. In various embodiments the drum or housing 11 can rotate between about any two of the above referenced times.

In one embodiment drum or housing 11 can have an average diameter of bout 5, 10, 15, 20, 24, 25, 30, 35, 36, 40, 45, 50, 55, 60, 62, 65, 70, 75, 80, 85, 90, 95, 100, 105, 110, 115, and/or 120 inches. In various embodiments the drum or housing 11 can have an average diameter between about any two of the above referenced diameter. In one embodiment drum or housing 11 has an average diameter is sufficient to produce the gap 69 as shown in FIG. 8 for each of the oysters 70 that are tumbled within the drum 11 interior 26.

Figure 10:
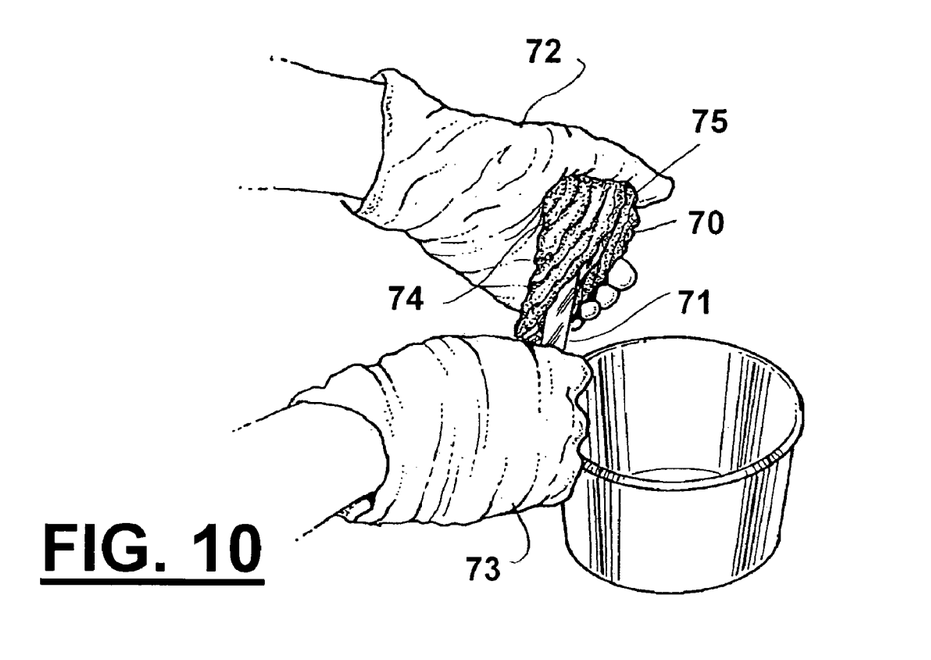
FIGS. 10 and 11 are perspective views that illustrate an opening of the oyster shown in FIG. 8, having been rotated in the drum for a selected period of time.
Figure 11:
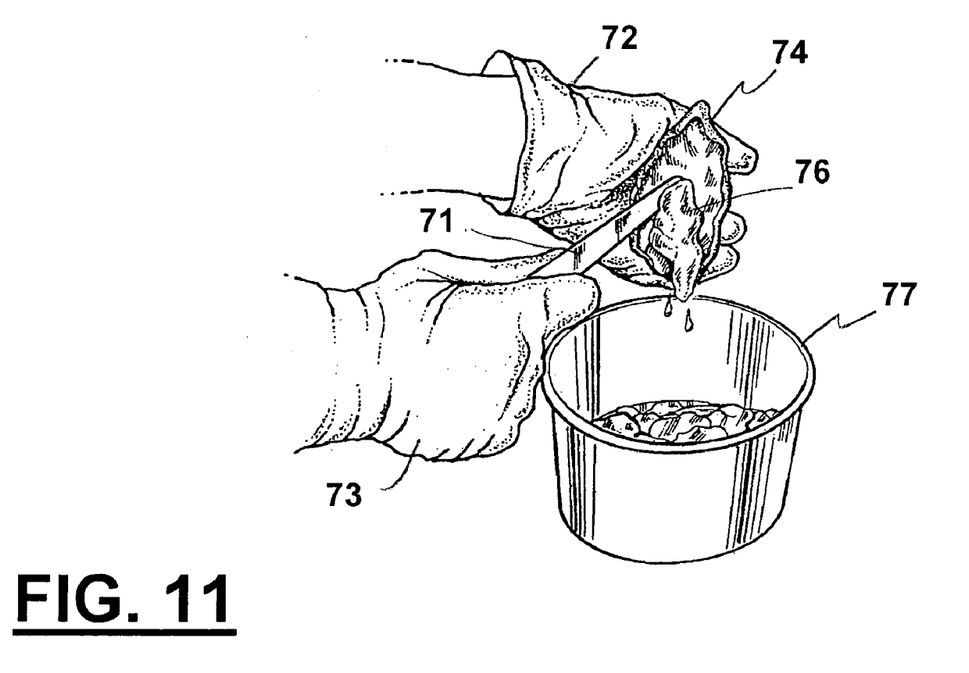

Once the gap 69 has been opened, the oysters 70 are very easy to open using a conventional oyster knife 71. In FIGS. 10 and 11, the hands 72, 73 of a user are shown. One hand 72 is holding the oyster 70. The other hand 73 holds the oyster knife 71. The gap 69 as shown in FIG. 8 enables the knife 71 to be placed in between the parts or halves 74, 75 of the shell of the oyster 70. Once the shells or parts 74, 75 are separated, edible part 76 is easily removed using the knife 71. When opening oysters 70 in this fashion, a clean receptacle 77 is employed wherein multiple edible parts 76 are dropped into receptacle 77 over a period of time.

The following is a list of parts and materials suitable for use in the present invention.

| PARTS LIST | |
| --- | --- |
| Part Number | Description |
| 10 | oyster opening apparatus |
| 11 | drum/housing |
| 12 | drum support frame |
| 13 | horizontal beam |
| 14 | web |
| 15 | flange |
| 16 | flange |
| 17 | wall |
| 18 | wall |
| 19 | inclined support |
| 20 | slot |
| 21 | wall |
| 22 | floor |
| 23 | cylindrical side wall |
| 24 | end wall |
| 25 | end wall |
| 26 | interior |
| 27 | perforations |
| 28 | beam |
| 29 | end portion |
| 30 | end portion |
| 31 | pinned connection |
| 32 | vertical beam |
| 33 | diagonal member |
| 34 | diagonal member |
| 35 | horizontal member |
| 36 | vertical member |
| 37 | lifting device |
| 38 | lifting device |
| 39 | trolley |
| 40 | trolley |
| 41 | winch/drum |
| 42 | winch/drum |
| 43 | line |
| 44 | line |
| 45 | lifting eye |
| 46 | door |
| 47 | pin |
| 48 | eye |
| 49 | eye |
| 50 | rotary bearing |
| 51 | rotary bearing |
| 52 | header |
| 53 | opening |
| 54 | support |
| 55 | support |
| 56 | water supply hose |
| 57 | valve |
| 58 | coupling |
| 59 | handle |
| 60 | motor drive |
| 61 | chain |
| 62 | baffle/plate/projection |
| 63 | baffle/plate/projection |
| 64 | baffle/plate/projection |
| 65 | rounded end portion |
| 66 | rounded end portion |
| 67 | rounded end portion |
| 68 | arrow |
| 69 | gap |
| 70 | unopened oyster |
| 71 | oyster knife |
| 72 | hand |
| 73 | hand |
| 74 | shell part |
| 75 | shell part |
| 76 | edible part |
| 77 | receptacle/container |
| 78 | channel |
| 79 | arrow |
| 80 | arrow |
| 82 | arrow |

-continued

PARTS LIST

| Part Number | Description |
| --- | --- |
| 86 | angle |
| 88 | angle |
| 90 | angle |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An oyster processing apparatus, comprising;
   a) a rotatable drum having upper and lower end portions, an outer wall, and an interior;
   b) an entry that enables unopened oysters to be added to the drum interior;
   c) a frame that supports the drum during rotation;
   d) rotary bearings that form an interface between the drum and the frame;
   e) the drum rotating about an axis; and
   f) one or more baffles that extend inwardly from the drum wall along lines which are parallel to the axis of rotation, each baffle being sized and shaped to carry oysters from a position near the lower end portion of the drum to a position near the upper end portion of the drum, and wherein during rotation of the drum oysters fall from the upper end portion of the drum to the lower end portion of the drum when the baffle reaches a position near the upper end portion of the drum.

2. The oyster processing apparatus of claim 1, wherein each of the baffles are a flat plate with enlarged rounded tips at their free ends.

3. The oyster processing apparatus of claim 2, wherein each of the baffles are symmetrically distributed around a cross section of the drum and offset relative to the axis of rotation between about five and thirty degrees.

4. The oyster processing apparatus of claim 1, wherein the drum is pivotally mounted on the frame, the axis of pivot being perpendicular to the axis of rotation, and the frame includes first and second winches, the first winch being operably connected to the drum and raising and causing the drum to pivot about the axis of pivot, the second winch being attachable to a sack of oysters and raising the sack for loading into the drum.

5. The oyster processing apparatus of claim 4, wherein the first and second winches are movably connected to the frame and horizontally positionable relative to the drum.

6. A method of opening a plurality of oysters comprising:
   (a) providing a rotating device, the rotating device including a frame and a drum rotatively connected to the frame about an axis of rotation, the drum having a plurality of plates within an interior of the drum, the drum also pivotally connected to the frame the axis of pivot being perpendicular to the axis of rotation, the frame including a winch causing the drum to pivot about the pivot axis;
   (b) placing the drum in a loading position wherein the drum is angled upwardly;
   (c) placing a plurality of oysters contained in closed oyster shells in the drum;
   (d) using the winch to pivot the drum about the pivot axis of rotation causing the drum to be horizontal;
   (e) rotating the plurality of oysters with the rotating device and causing a plurality of the closed oyster shells to at least partially be separated;
   (f) using the winch to pivot the drum about the pivot axis of rotation causing the drum to be angled downwardly;
   (g) removing from the drum the plurality of at least partially separated oyster shells; and
   (h) removing oysters from the plurality of at least partially separated oysters shells.

7. The method of claim 6, wherein in step "c" a sackfull of closed oyster shells are removed from the sack containing the closed oyster shells, and placed in the drum.

8. The method of claim 6, wherein in step "a" the frame includes a second winch and in step "c" the second winch is used to lift a sack of oysters and place these oysters without the sack into the drum.

9. The method of claim 6, wherein in step "a" the winch can move horizontally relative to the drum.

10. The method of claim 8, wherein the second winch is moved horizontally relative to the drum during step "c".

11. The method of claim 6, wherein in step "a" the winch can move horizontally relative to the drum and between steps "d" and "f" the winch is moved horizontally relative to the drum.

12. The method of claim 6, wherein in step "e," water is sprayed in the rotating device, and also sprayed in the rotating device after step "c" is completed.

\* \* \* \* \*